United States Patent [11] 3,554,415

| [72] | Inventor | William T. Woods |
| | | Rte 1, Bertrand, Mo. 63823 |
| [21] | Appl. No. | 747,955 |
| [22] | Filed | July 26, 1968 |
| [45] | Patented | Jan. 12, 1971 |

[54] BUMPER WITH SPARE TIRE CARRIER ASSEMBLY
6 Claims, 2 Drawing Figs.

[52] U.S. Cl. .................................................. 297/42.05,
224/42.06, 224/42.21, 224/42.23; 293/69, 293/71
[51] Int. Cl. ....................................................... B60r 9/00,
B60r 19/02; B62d 43/04
[50] Field of Search.......................................... 224/42.05,
42.06, 42.21, 42.23, 42.29; 293/69, 71

[56] References Cited
UNITED STATES PATENTS

| 1,813,094 | 7/1931 | Apel............................. | 224/42.23X |
| 2,016,955 | 10/1935 | Bryant.......................... | 224/42.05 |
| 2,574,465 | 11/1951 | Clark............................ | 224/42.21 |
| 3,323,667 | 6/1967 | Hall.............................. | 224/42.23X |

*Primary Examiner*—Arthur L. La Point
*Assistant Examiner*—Howard Beltran
*Attorney*—Edward C. Threedy

ABSTRACT: A combination bumper and spare tire mounting structure for a vehicle wherein the structure is slidably disposed beneath the vehicle body and movable longitudinally through a horizontal plane with respect thereto so as to provide access to the spare tire carried thereby.

PATENTED JAN 12 1971

3,554,415

INVENTOR.
WILLIAM T. WOODS.
BY Edward C. Threedy.
HIS ATTORNEY.

3,554,415

BUMPER WITH SPARE TIRE CARRIER ASSEMBLY

SUMMARY OF THE INVENTION

A subframe connected beneath a vehicle body frame providing a compartment for a spare tire mount that is slidable longitudinally through a horizontal plane from a recessed position beneath the vehicle body to an exposed position relative thereto with the subframe forming a bumper for the vehicle.

The principle object of the above summarized invention is to provide means by which a spare tire may be stored in a relatively shallow compartment that is readily withdrawn from a stored position beneath the frame of the vehicle with the means comprising a portion of the vehicle body in the form of a bumper or the like.

DETAILED DESCRIPTION

The invention will be best understood by reference to the accompanying drawings in which there is shown the preferred form of construction and in which.

Figure 1:
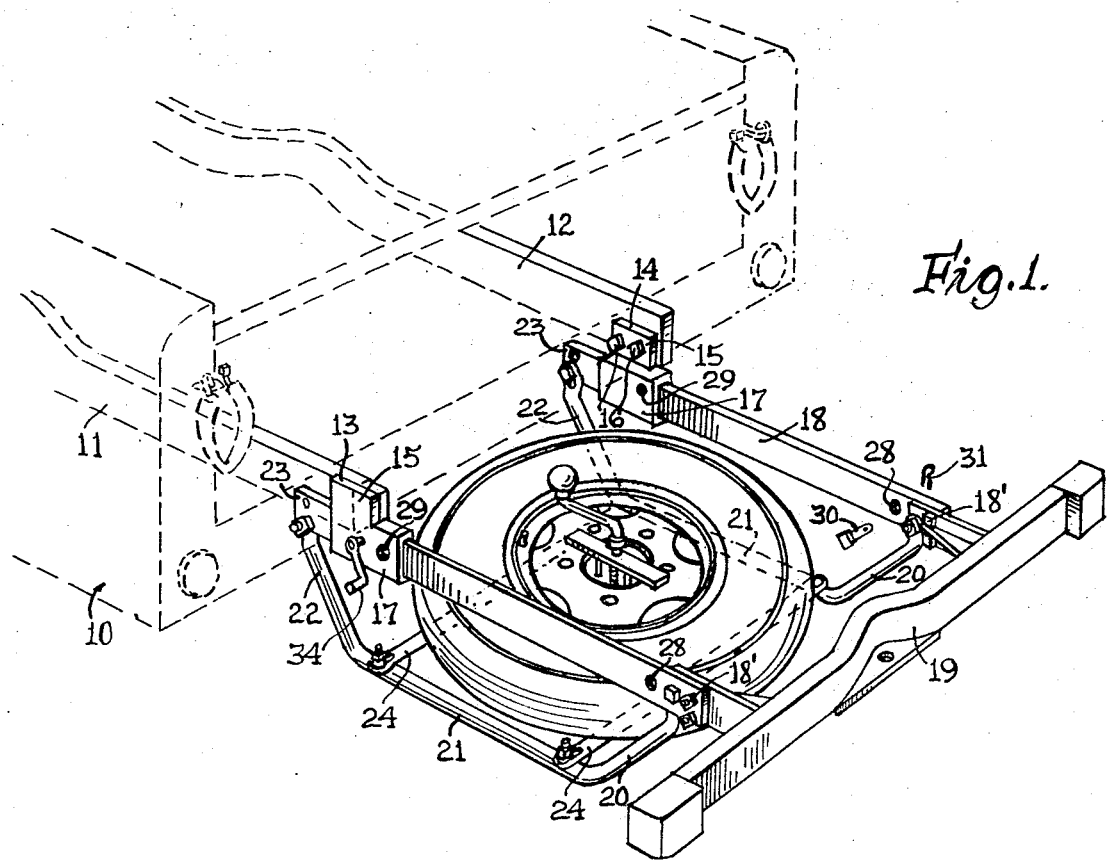
FIG. 1 is a fragmentary detailed view of the improved combination tire mount and vehicle bumper with so much of the vehicle body necessary for an understanding of the invention shown in dotted lines.

In FIG. 1 there is shown in dotted lines the partial outline of a vehicle body 10 having structural frame members 11 and 12. Connected to these frame members 11 and 12 adjacent their ends are mounting brackets 13 and 14. Each bracket provides a vertical plate 15 which by bolts 16 fixedly attached to the end portions of the frame members 11 and 12.

The brackets 13 and 14 include hollow elongated horizontally disposed sleeves 17 through which slidably project longitudinally extending rails 18. The rails are preferably rectangular in cross section with their longitudinal edges disposed in vertical alignment thus utilizing the bend resisting strength inherent in their edgewise width.

Connected by bolts to corresponding free ends of the rails 18 and extending perpendicularly thereto is a bumper 19. Also connected to the free ends of the rails 18 are corresponding forward ends 20 of the tire supporting hanger arms 21. The rear ends 22 of such hanger arms 21 are connected to the inner end portions 23 of the rails 18.

The ends 20 and 22 of the hanger arms 21 are formed so as to extend in an upwardly and outwardly inclined relation to a medial portion so as to suspend such medial portion of the hanger arms 21 beneath the rails 18 as clearly shown in the drawing.

At the base of each of the inclined end portions 20 and 22 of the hanger arms 21 and extending transversely therebetween are braces 24. Carried by the braces 24 midway between the hanger arms 21 and extending in a parallel relation with respect thereto is a mounting bar 25. This mounting bar 25 is provided with a threaded aperture into which is removably threaded the shank portion 26 of a tire restraining clamp 27.

Figure 2:
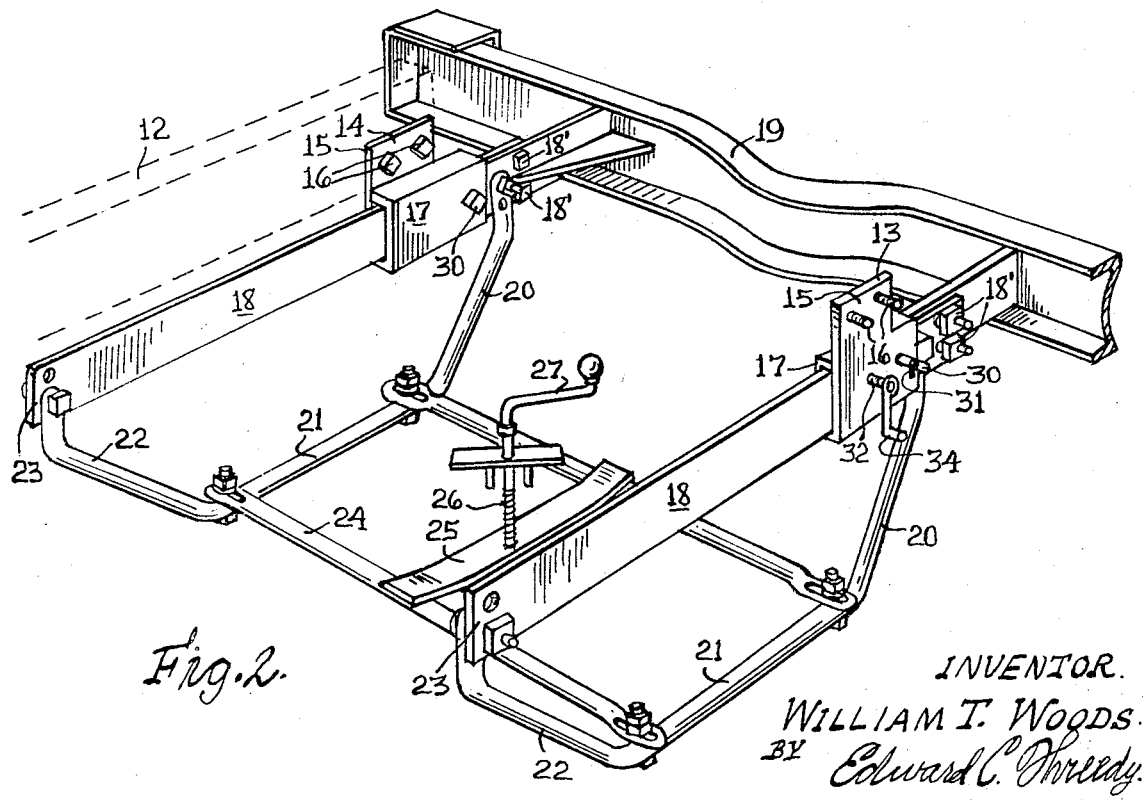
FIG. 2 is a perspective view of the improved combination spare tire mount and bumper structure with the tire removed.

Each of the rails 18 as well as the sleeves 17 of the mounting brackets 13 and 14 have formed therethrough apertures 28 and 29, respectively, through which retaining bolts 30 may be projected to latch the rails with respect the to the mounting brackets in their retracted position as shown in FIG. 2. A clip wire 31 (see FIG. 1) may be employed to retain the bolt 30 in its latching position.

By reason of the fact that the rails are slidably projected through the sleeves 16 of the mounting brackets 13 and 14 there is a degree of clearance therebetween which, due to the environment of the invention, results in some vibration between the rails 18 and the mounting brackets 13 and 14. To prevent this vibration I provide a clamp which includes a bolt 32 threaded through the outer wall 33 of each of the sleeves 17 (only one being shown in the drawing with the understanding that a corresponding structure is associated with the sleeve of the other mounting bracket). Each of the threaded bolts 32 is carried by a crank 34 which facilitates threading the bolts 32 through the walls 33 of the sleeves against the sides of the rails 18 when they are latched in their retracted position beneath the frame of the vehicle.

Thus when the spare tire carrier is in its retracted position the rails 18 thereof will extend beneath the frame members 11 and 12 of the vehicle, and the apertures 28 formed therein will be in alignment with the apertures 29 formed through the sidewalls 33 of the sleeves 17 of the mounting brackets 13 and 14. The retaining bolts 30 will be projected through the apertures 28 and 29, and by the wire clip 31 be held in retaining position. By manipulation of the cranks 34 the bolts 32 will be threaded through the side walls 33 of the sleeves 17 against the sides of the rails 18 to fixedly clamp the same a nonvibrating retracted position. The sleeves 17 are of such a length that they will provide adequate horizontal support for the rails 17 such that they will be properly carried beneath and in parallel relation to the frame members 11 and 12 of the vehicle.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

I claim:

1. A vehicle spare tire and bumper mount carried beneath the body frame members of a vehicle wherein the improvement comprises:

a. a pair of mounting brackets fixedly connected to corresponding ends of the body frame members of the vehicle;

b. said brackets providing elongated hollow sleeves extending horizontally and parallel to the body frame members of the vehicle;

c. a pair of rails slidably journaled through said sleeves and movable to and from a position beneath the body of the vehicle and supporting at one end a vehicle bumper member;

d. means cooperating between said rails and said sleeves for latching said rails beneath the body frame members of the vehicle and said bumper member outwardly of the body of the vehicle;

e. hanger means depending from between the ends of said rails and to either side of said sleeves and engageable therewith to limit slidable movement of said rails therethrough in either direction and to define therebetween a compartment for a spare tire; and f. an adjustable clamp means between said sleeves and said rails for preventing vibrational movement therebetween when said rails are in their stored position beneath the body frame of the vehicle.

2. The vehicle spare tire and bumper mount as disclosed by claim 1 and further defined by having a spare tire clamp carried by said hanger means for removably mounting a tire within the compartment defined thereby for movement with said rails and said bumper member relative to the frame of the vehicle.

3. A vehicle spare tire and bumper mount as defined by claim 1 wherein said means cooperating between said rails and said sleeves for latching said rails beneath the body frame members comprise removable retainer bolts projected through openings formed in said rails and said sleeves which are in alignment when the rails are moved through said sleeves into a retracted position beneath the body frame members of the vehicle.

4. A vehicle spare tire and bumper mount as defined by claim 1 wherein said adjustable clamp means comprise a crank having a shank portion threadable through one wall of the hollow sleeve into abutment with the side of the rail to clamp the same together against vibration when the rails are in a retracted position beneath the body frame members of the vehicle.

5. A vehicle spare tire and bumper mount as defined by claim 4 wherein said means cooperating between said rails and said sleeves for latching said rails beneath the body frame members comprise removable retainer bolts projected through openings formed in said rails and said sleeves which are in alignment when the rails are moved through said sleeves into a retracted position beneath the body frame members of the vehicle.

6. A vehicle spare tire and bumper mount as disclosed by claim 5 and further defined by having a spare tire clamp carried by said hanger means for removably mounting a tire within the compartment defined thereby for movement with said rails and said bumper member relative to the frame of the vehicle.